United States Patent [19]
Choi

[11] Patent Number: 5,581,425
[45] Date of Patent: Dec. 3, 1996

[54] HEAD DRUM FOR A MAGNETIC RECORDING/REPRODUCING APPARATUS

[75] Inventor: Hwan-young Choi, Suwon, Rep. of Korea

[73] Assignee: Samsung Electronics Co. Ltd., Kyungki-Do, Rep. of Korea

[21] Appl. No.: 331,739

[22] Filed: Oct. 31, 1994

[30] Foreign Application Priority Data

Nov. 13, 1993 [KR] Rep. of Korea ............... 93-24115

[51] Int. Cl.⁶ .................. G11B 5/027; G11B 5/52
[52] U.S. Cl. ........................... 360/107; 360/84
[58] Field of Search ............. 360/84, 107; 384/100, 384/107, 110, 124, 133

[56] References Cited

U.S. PATENT DOCUMENTS

| | | | |
|---|---|---|---|
| 4,972,283 | 11/1990 | Kim | 360/107 |
| 5,323,076 | 6/1994 | Hasel | 310/90 |
| 5,328,271 | 7/1994 | Titcomb | 384/108 |
| 5,448,120 | 9/1995 | Schaule et al. | 360/98.07 |

*Primary Examiner*—A.J. Heinz
*Assistant Examiner*—David D. Davis
*Attorney, Agent, or Firm*—Sughrue, Mion, Zinn, Macpeak & Seas

[57] ABSTRACT

A head drum, for a magnetic recording/reproducing apparatus, includes a hemispheric hydraulic bearing capable of reducing frictional resistances created due to an axial direction force and a radial force generated at the same time, thereby facilitating the assembling and manufacturing of the head drum.

5 Claims, 4 Drawing Sheets

HEAD DRUM FOR A MAGNETIC RECORDING/REPRODUCING APPARATUS

BACKGROUND OF THE INVENTION

1. Field of the Invention

The present invention relates to a head drum for a magnetic recording/reproducing apparatus and, more particularly, to a head drum for a magnetic recording/reproducing apparatus having an improved hydraulic bearing system.

2. Description of the Related Art

A head drum is used in a magnetic recording/reproducing apparatus for recording data on magnetic recording tape or reproducing the recorded data from the magnetic recording tape. The head drum comprises two opposing drum members, one of the two members rotating with respect to the other, containing a head mounted therein. The magnetic recording tape travels in contact with the outer circumference of the head drum, and the rotatable drum member rotates to detect an electrical signal from the tape. Such a head is depicted in FIG. 1.

In FIG. 1, a lower drum 70 is fixed to the lower portion of a shaft 60. An upper drum 80 is installed at the upper portion of the shaft 60 and is rotatable with respect thereto. Thus, the upper drum 80 comprises a body 84 the outer circumference of which comes into contact with magnetic recording tape, and a bush 85 press-fitted into the center of body 84. The top end surface of shaft 60 is in contact with a thrust hydraulic bearing 90 fixed to the upper drum 80 by a bolt 81. Radial hydraulic bearings 66 are formed on the outer circumference of shaft 60 at locations coming into contact with upper drum 80. The structures of the hydraulic bearings 90 and 66 are schematically shown in FIGS. 2, 3 and 4. FIG. 2 is a bottom view of the thrust hydraulic bearing 90. FIG. 3 is a sectional view of FIG. 2 cut along the line III—III thereof. FIG. 4 is an enlarged view of the radial hydraulic bearing 66 extracted from the head drum 9 shown in FIG. 1.

Referring to FIGS. 2, 3 and 4, a plurality of grooves 91 are provided at the center portion of thrust hydraulic bearing 90 coming into contact with the top end surface of the shaft 60. A lubricant such as air or oil is introduced into the grooves. Grooves 67 are formed on the outer circumference of the shaft 60 at locations coming into contact with upper drum 80 so as to constitute a radial hydraulic bearing 66. The lubricant is also introduced into grooves 67.

In the head drum constructed as above, as the upper drum 80 rotates with respect to the shaft 60, a frictional resistance produced by a force acting in the radial direction of shaft 60 is generated between the upper drum 80 and the outer circumference of the shaft 60 at locations coming into contact with upper drum 80. Further, frictional resistance acting in the axial direction of the shaft 60 is created due to the weight of the upper drum 80. The frictional resistances generated by the forces acting in the axial direction and radial direction decrease due to the thrust hydraulic bearing 90 and the radial hydraulic bearing 66 so that the upper drum 80 rotates smoothly with respect to the shaft 60. The radial hydraulic bearing 66 may be formed on the inner circumference of the bush 85 instead of on the outer circumference of the shaft 60, thereby obtaining the same effect as that of the head drum 9.

In order to reduce the frictional resistance between the upper drum 80 and the shaft 60 created due to the rotation of the upper drum 80 and thereby to smoothly rotate the upper drum 80, the conventional head drums separately comprise radial hydraulic bearing 66 and thrust hydraulic bearing 90, which thus involves the following problems:

First, the radial hydraulic bearing 66 requires the grooves formed on the outer circumference of the shaft 60 or on the inner circumference of the bush 85. However, it is very complicated to form the grooves on the outer circumference of the shaft 60 or on the inner circumference of the bush 85. Further, in assembling the head drums, there must be strictly maintained a parallelism between the thrust hydraulic bearing 90 and the end surface of the shaft 60 coming into contact therewith, so that the assembling process is slow and unreliable.

SUMMARY OF THE INVENTION

Therefore, in order to overcome the above problems, it is an object of the present invention to provide a head drum having a hydraulic bearing which is able to reduce frictional resistances generated by forces acting in the axial direction and radial direction when a rotatable drum rotates.

To accomplish the object of the present invention, there is provided a head drum, for a magnetic recording/reproducing apparatus, comprising a first drum, a shaft fixed to the first drum, and a second drum disposed oppositely to the first drum and mounted for relative rotation with respect to the shaft. The head drum further comprises: at least one hemispheric hydraulic bearing, for rotatably supporting the second drum, including a smaller-diameter portion, a larger-diameter portion and an outer circumferential portion extending therebetween, a plurality of grooves, for holding a lubricant, formed on the outer circumferential portion, and a center opening portion for fixedly receiving the shaft therethrough; and a hemispheric-bearing mounting portion disposed in the second drum for mounting the hydraulic bearing.

BRIEF DESCRIPTION OF THE DRAWINGS

The above object and advantages of the present invention will become more apparent by describing in detail a preferred embodiment thereof with reference to the accompanying drawings, in which.

DETAILED DESCRIPTION OF THE PREFERRED EMBODIMENTS

Figure 1:
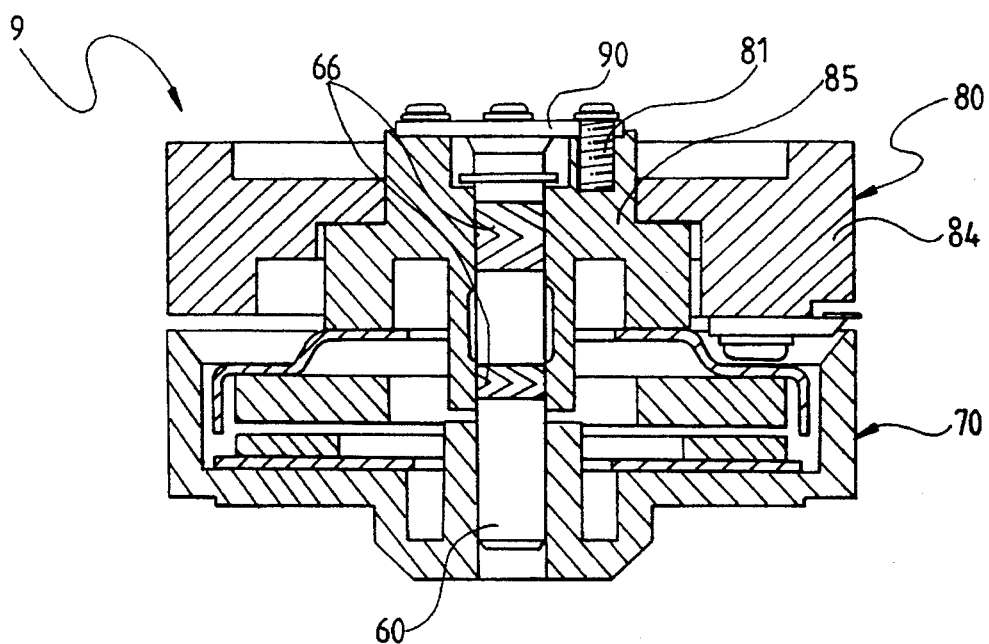
FIG. 1 is a sectional view of a conventional head drum.
Figure 2:
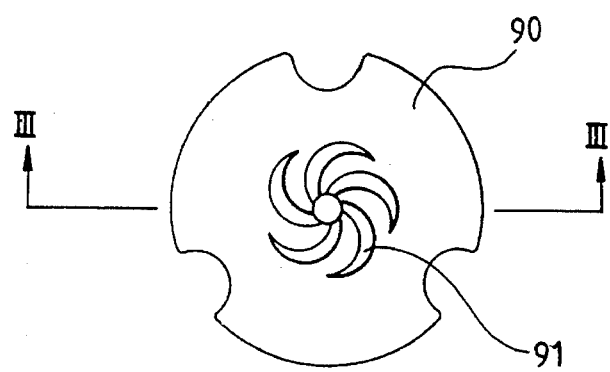
FIG. 2 is a bottom view of the thrust hydraulic bearing of FIG. 1.
Figure 3:
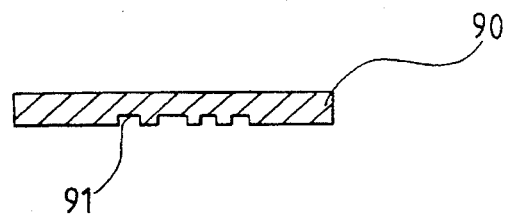
FIG. 3 is a sectional view of FIG. 2 cut along line III—III.
Figure 4:
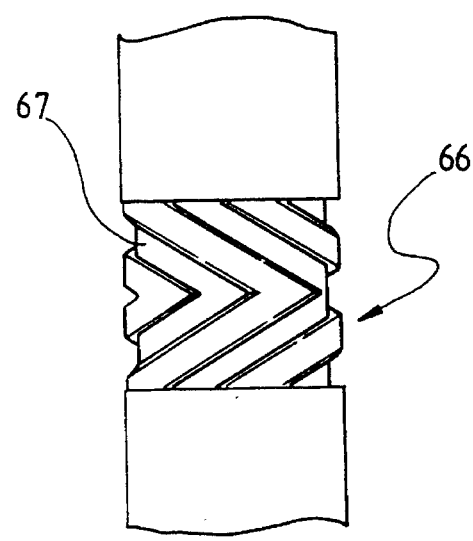
FIG. 4 is a partially enlarged view of the radial hydraulic bearing of FIG. 1.
Figure 5:
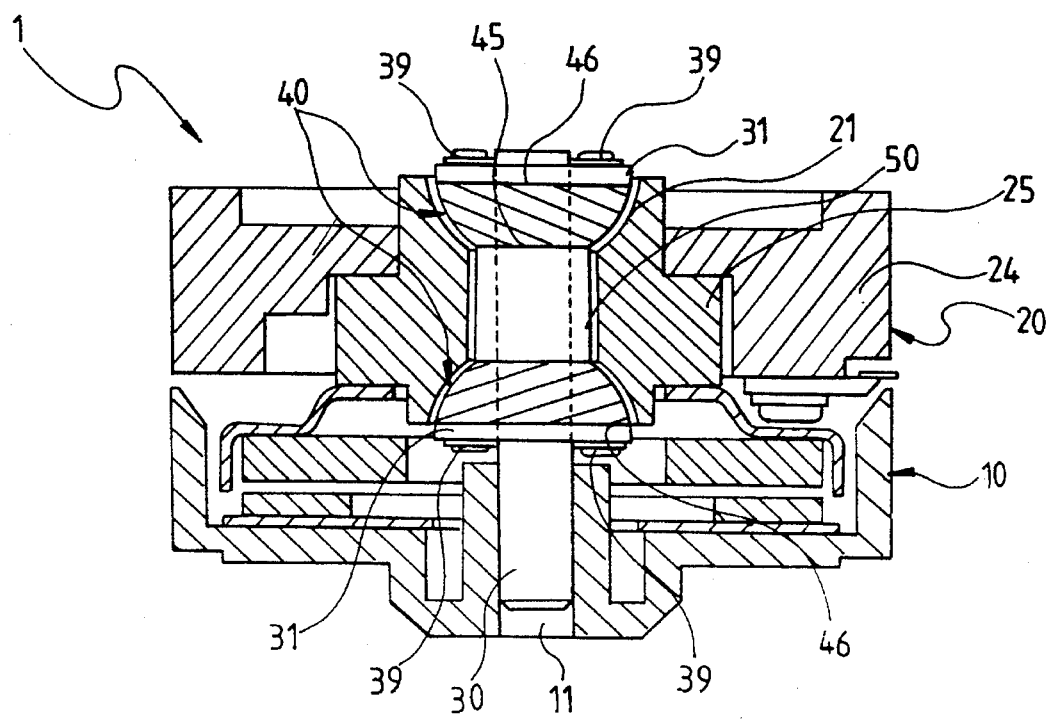
FIG. 5 is a cross-sectional view of a head drum of the present invention.
Figure 6:
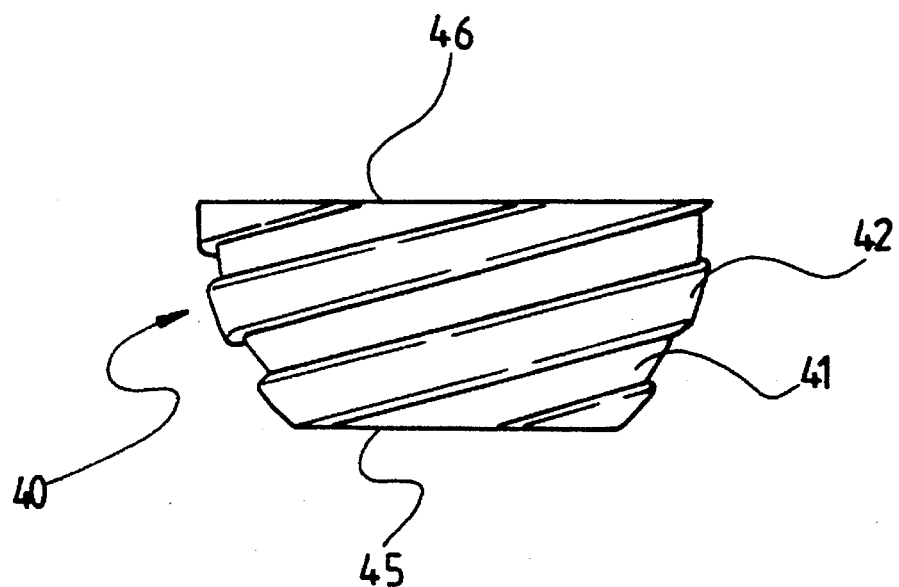
FIG. 6 is an enlarged view of the hydraulic bearing of FIG. 5.
Figure 7:
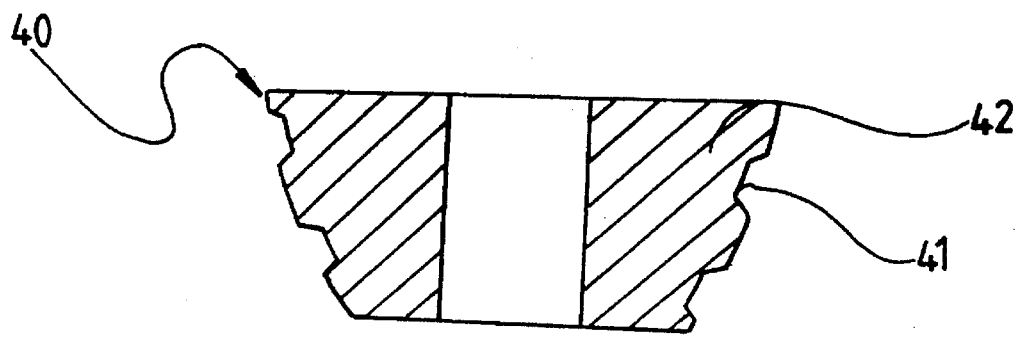
FIG. 7 is a sectional view of the hydraulic bearing of FIG. 6.

Referring to FIGS. 5, 6 and 7, one end of a shaft 30 is inserted into a through-hole 11 of a first drum 10 which is then fixed to the shaft 30. A flange 31 is fixed to the other end of the shaft 30. A hemispheric hydraulic bearing 40 having a smaller-diameter portion 45 and a larger-diameter portion 46 is fixed to flange 31 by a bolt 39. The hemispheric hydraulic bearing may be fixed by friction fit or bonding. Therefore, the center portion of the hydraulic bearing 40 is fixed to shaft 30. Grooves 41 are formed on the outer circumference of body 42 of hydraulic bearing 40 (see FIGS. 6 and 7), to allow a lubricant such as air or oil to be introduced therein. It is preferable, as shown in FIG. 5, that the hydraulic bearing 40 be installed in pairs. It is also preferable that smaller-diameter portions 45 of the two hydraulic bearings 40 are oppositely installed.

It is further preferable that a cylindrical member 50, which serves as a spacer through which shaft 30 passes, be installed between the two hydraulic bearings 40, with opposite ends of the cylindrical member 50 coming into contact with a corresponding hydraulic bearing 40. A second drum 20 lies opposite to the first drum 10 and is able to rotate with respect to shaft 30. The second drum 20 comprises a body 24 the outer circumference of which comes into contact with a magnetic recording tape, and a bush 25 friction fitted into the center of body 24. The bush 25 comprises hemispheric bearing mounting portions 21 on which the hemispheric hydraulic bearings 40 are positioned.

In the head drum 1 constructed as above, as second drum 20 rotates with respect to shaft 30, frictional resistances are created between the shaft 30, which is fixed to the first drum 10, and the second drum 20, due to the force acting in the radial direction of the shaft 30 and due to the weight of the second drum 20 acting in the axial direction. These frictional resistances are reduced by the hemispheric bearings 40 having a smaller-diameter portion 45 and larger-diameter portion 46 so that the second drum 20 rotates smoothly with respect to shaft 30. In other words, the frictional resistance by the force acting in the axial direction of shaft 30 is reduced by the horizontal plane components (components of a plane parallel to the radial direction of the shaft) of the outer circumference of the hydraulic bearing 40 and bearing mounting portion 21. The frictional resistance due to the force acting in the radial direction of shaft 30 is reduced by the vertical plane components (components of a plane perpendicular to the axial direction) of the outer circumference of the hydraulic bearing 40 and bearing mounting portion 21. The hydraulic bearing 40 can be separately manufactured and coupled to shaft 30. This indicates that the manufacturing and assembling process of the head drum of the present invention is improved, as compared with the conventional technology in which the conventional head drum 9 discussed with respect to FIGS. 1–4 comprises a separate radial hydraulic bearing 66 directly formed on shaft 60.

In the embodiment of the present invention, a case has been explained in which the second drum 20 rotates with respect to the shaft 30 fixed to first drum 10, but the same effect as described above can be yielded by rotating the first drum 10 and the shaft 30 with respect to the second drum 20.

Figure 8:
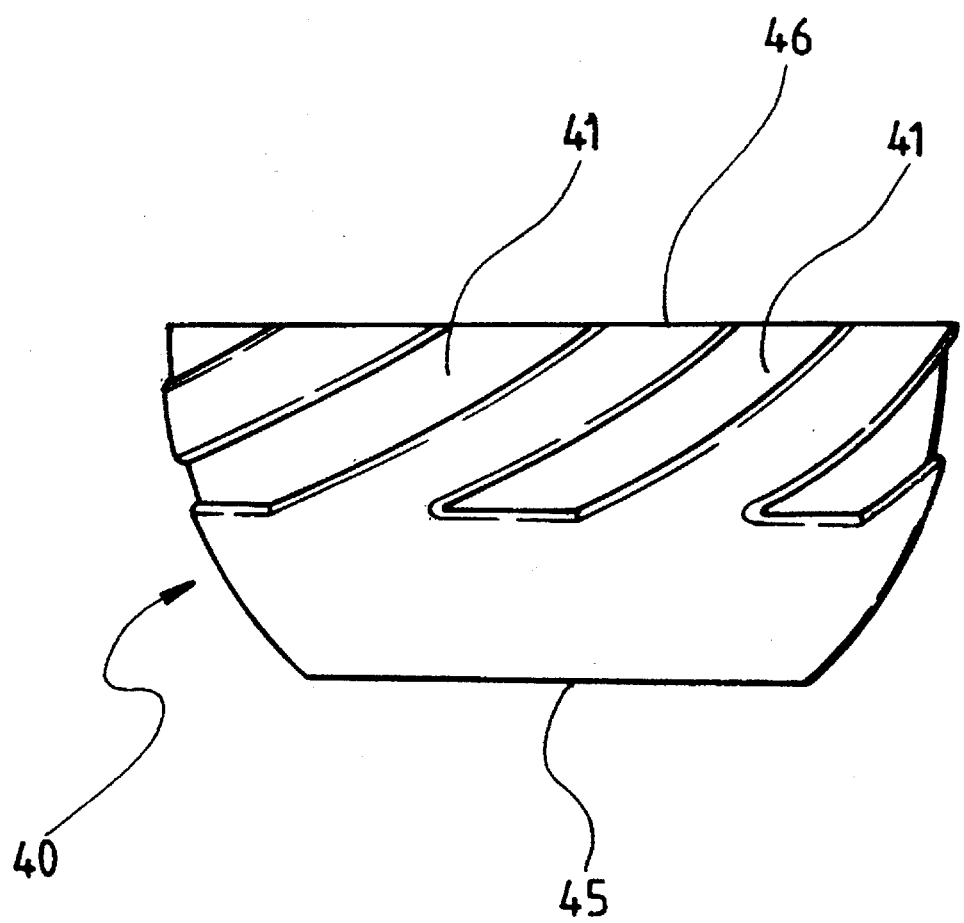
FIG. 8 is a front view of another embodiment of the hydraulic bearing of the present invention.

In FIGS. 5 and 7, both ends of the grooves 41 formed on the outer circumference of the hydraulic bearing 40 are depicted as being connected to the small-diameter portion 45 and large-diameter portion 46. However, as shown in FIG. 8, it is possible that one side of the grooves 41 is connected to the large-diameter portion 46 and the other side thereof is broken between the small-diameter portion 45 and the large-diameter portion 46. Conversely, one side of grooves 41 may be connected to the small-diameter portion 45, with the other side thereof being broken between the small-diameter portion 45 and the large-diameter portion 46.

As described above, the present invention is easy to assemble because it dispenses with the conventional thrust hydraulic bearing and radial hydraulic bearing and therefore has a hemispheric hydraulic bearing capable of reducing frictional resistance due to axial direction force and frictional resistance due to radial force which are created at the same time. Further, since the hydraulic bearing of the present invention can be manufactured separately and coupled to the shaft, a reduction in working efficiency caused by directly forming the hydraulic bearings on the shaft can be prevented.

It is contemplated that numerous modifications may be made to the head drum of the present invention without departing from the spirit and scope of the invention as defined in the following claims.

What is claimed is:

1. A head drum, for a magnetic recording/reproducing apparatus, comprising:

a first drum;

a shaft fixed to said first drum;

a second drum disposed oppositely to said first drum and mounted for relative rotation with respect to said shaft;

at least one hemispheric hydraulic bearing, for rotatably supporting said second drum, including a smaller-diameter portion, a larger-diameter portion and an outer circumferential portion extending therebetween, a plurality of grooves, for holding a lubricant, formed on said outer circumferential portion, and a center opening portion which fixedly receives said shaft therethrough; and a hemispheric-bearing mounting portion disposed in said second drum for mounting said hemispheric hydraulic bearing.

2. The head drum for a magnetic recording/reproducing apparatus as claimed in claim 1, further comprising another hemispheric hydraulic bearing so as to provide a pair of hemispheric hydraulic bearings for rotatably supporting said second drum.

3. The head drum for a magnetic recording/reproducing apparatus as claimed in claim 2, wherein the smaller-diameter portions of said pair of hemispheric hydraulic bearings are oppositely installed.

4. The head drum for a magnetic recording/reproducing apparatus as claimed in claim 2, further comprising a cylindrical member serving as a spacer through which said shaft passes and which is interposed between said pair of hemispherical hydraulic bearings.

5. The head drum for a magnetic recording/reproducing apparatus as claimed in claim 3, further comprising a cylindrical member serving as a spacer through which said shaft passes and which is interposed between said pair of hemispherical hydraulic bearings.

\* \* \* \* \*